(12) United States Patent
Isono

(10) Patent No.: US 6,417,975 B1
(45) Date of Patent: Jul. 9, 2002

(54) TAKING LENS SYSTEM

(75) Inventor: Masashi Isono, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/474,026

(22) Filed: Dec. 28, 1999

(30) Foreign Application Priority Data

Dec. 28, 1998 (JP) .......................................... 10-373630

(51) Int. Cl.[7] .......................... G02B 9/34; G02B 13/04
(52) U.S. Cl. ........................ 359/783; 359/753; 359/781
(58) Field of Search .............................. 359/749–753, 359/754–756, 758, 761, 763, 770–771, 781, 783, 738–740

(56) References Cited

U.S. PATENT DOCUMENTS

| | | | | |
|---|---|---|---|---|
| 5,684,293 A | * | 11/1997 | Kessler | 250/208.1 |
| 5,684,643 A | * | 11/1997 | Enomoto et al. | 359/751 |
| 5,703,726 A | | 12/1997 | Griffith | 359/753 |
| 5,724,195 A | * | 3/1998 | Enomoto et al. | 359/752 |
| 5,861,999 A | | 1/1999 | Tada | 359/752 |
| 6,075,658 A | * | 6/2000 | Nagahara | 359/753 |

FOREIGN PATENT DOCUMENTS

| | | |
|---|---|---|
| JP | 8-152557 | 6/1996 |
| JP | 9-113799 | 5/1997 |
| JP | 9-166748 | 6/1997 |
| JP | 9-222558 | 8/1997 |
| JP | 9-297264 | 11/1997 |
| JP | 10-78545 | 3/1998 |
| JP | 10-227973 | 8/1998 |
| JP | 10-293246 | 11/1998 |
| JP | 10-293247 | 11/1998 |

* cited by examiner

*Primary Examiner*—Jordan M. Schwartz
(74) *Attorney, Agent, or Firm*—Burns, Doane, Swecker & Mathis, LLP (57) ABSTRACT

A taking lens system has, from the object side, a front lens unit including a first lens element and a second lens element, an aperture stop, and a rear lens unit including a third positive lens element, a fourth negative lens element, and a fifth positive lens element. In the taking lens system, the following condition is fulfilled:

$$0.3 < F/F345 < 0.9$$

where

F represents the focal length of the entire taking lens system; and

F345 represents the composite focal length of the third to fifth lens elements.

29 Claims, 7 Drawing Sheets

FIG. 9A
FNO=2.87

-0.05    0.05
Spherical    Sine
Aberration   Condition

FIG. 9B
Y'= 3.36

-0.05    0.05
Astigmatism

FIG. 9C
Y'=3.36

-2.0    2.0
Distortion %

FIG. 10A
FNO=2.87
-0.05  0.05
Spherical    Sine
Aberration  Condition

FIG. 10B
Y'=3.36
-0.05  0.05
Astigmatism

FIG. 10C
Y'=3.36
-2.0  2.0
Distortion %

FIG. 11A
FNO=2.87
-0.05  0.05
Spherical    Sine
Aberration  Condition

FIG. 11B
Y'=3.36
-0.05  0.05
Astigmatism

FIG. 11C
Y'=3.36
-2.0  2.0
Distortion %

FIG. 17

TAKING LENS SYSTEM

This disclosure is based on application No. H10-373630 filed in Japan on Dec. 28, 1998, the entire contents of which are hereby incorporated by reference.

BACKGROUND OF THE INVENTION

1. Field of the Invention

The present invention relates to a taking lens system, and more particularly to a compact taking lens system suitable for use in a digital input apparatus such as a digital still camera or digital video camera.

2. Description of the Prior Art

In recent years, as personal computers become prevalent, digital still cameras, digital video cameras, and the like (hereafter referred to simply as digital cameras) that allow easy storage of image data in a digital format have become more popular for personal use. Such digital cameras are expected to become more widespread as an apparatus for inputting image data.

On the other hand, such digital cameras have come to employ smaller and smaller solid-state imaging devices, for example, CCDs (charge-coupled devices), and therefore digital cameras themselves are quite naturally expected to be made more compact. Consequently, further miniaturization is eagerly sought in taking lens systems, because they occupy the largest space within digital input devices.

To cope with such requirements, for example, Japanese Laid-open Patent Application No. H9-166748 proposes a compact taking lens system suitable for use in a camera having a CCD that is composed of as few constituent lens elements as possible. In this proposed arrangement, however, the taking lens system has a negative-positive-positive lens arrangement on the rear (image) side of its aperture stop. In a taking lens system of this type, convex lens elements are located in a rear portion thereof, and therefore it is difficult to secure a sufficient edge margin in the convex lens elements. This makes it difficult to achieve further miniaturization of the entire taking lens system. In this context, the edge margin of a lens element refers to the portion of the lens element that falls outside its effective diameter.

SUMMARY OF THE INVENTION

An object of the present invention is to provide a compact taking lens system that offers sufficiently high optical performance. To achieve this object, according to one aspect of the present invention, a taking lens system is provided with, from the object side, a first negative lens element, a second biconvex lens element, an aperture stop, a third positive lens element, a fourth negative lens element, and a fifth positive lens element. In the taking lens system, the following condition is fulfilled:

$$-0.99 < (r21+r22)/(r21-r22) < 0.56$$

where r21 represents the radius of curvature of the object-side surface of the second lens element; and r22 represents the radius of curvature of the image-side surface of the second lens element.

According to another aspect of the present invention, a taking lens system is provided with, from the object side, a first biconcave lens element, a second positive lens element, an aperture stop, a third positive lens element, a fourth negative lens element, and a fifth positive lens element. In the taking lens system, the following condition is fulfilled:

$$0.12 < n2-n1 < 0.39$$

where n1 represents the refractive index of the first lens element for the d line; and n2 represents the refractive index of the second lens element for the d line.

According to another aspect of the present invention, a taking lens system is provided with, from the object side, a first negative lens element, a second positive lens element, an aperture stop, a third positive lens element, a fourth negative lens element, and a fifth positive lens element. The third and fourth lens elements are cemented together. In the taking lens system, the following condition is fulfilled:

$$-0.02 < F/F34 < 0.18$$

where

F represents the focal length of the entire taking lens system; and

F34 represents the focal length of the doublet lens element formed by cementing together the third and fourth lens elements.

According to another aspect of the present invention, a taking lens system is provided with, from the object side, a first negative lens element, a second biconvex lens element, an aperture stop, a third positive lens element, a fourth negative lens element, and a fifth positive lens element. The third and fourth lens elements are cemented together. In the taking lens system, the following condition is fulfilled:

$$0.3 < F/F345 < 0.9$$

where

F represents the focal length of the entire taking lens system; and

F345 represents the composite focal length of the third to fifth lens elements.

According to still another aspect of the present invention, a taking lens system is provided with, from the object side, a first negative lens element, a second biconvex lens element, an aperture stop, a third positive meniscus lens element convex to the image side, a fourth negative lens element, and a fifth positive lens element. The fourth and fifth lens elements are cemented together. In the taking lens system, the following condition is fulfilled:

$$0.3 < F/F345 < 0.9$$

where

F represents the focal length of the entire taking lens system; and

F345 represents the composite focal length of the third to fifth lens elements.

BRIEF DESCRIPTION OF THE DRAWINGS

The objects and features of this invention will become clear from the following description, taken in conjunction with the preferred embodiments with reference to the accompanied drawings in which.

DESCRIPTION OF THE PREFERRED EMBODIMENTS

Figure 1:
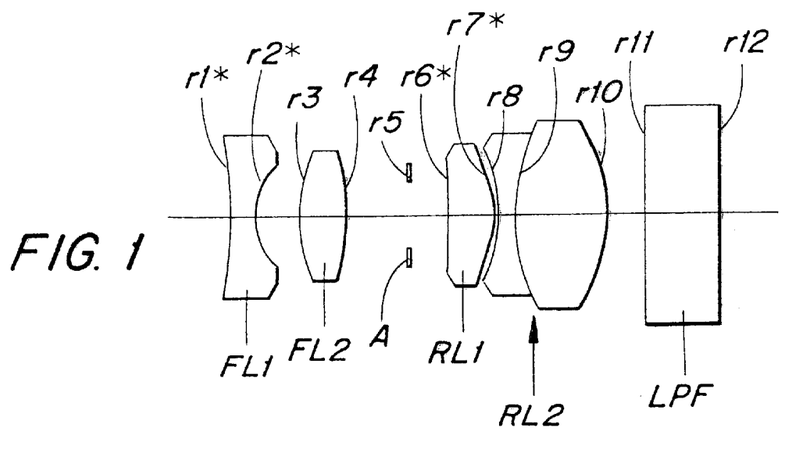
FIG. 1 is a lens arrangement diagram of the taking lens system of a first embodiment (Example 1) of the present invention.
Figure 2:
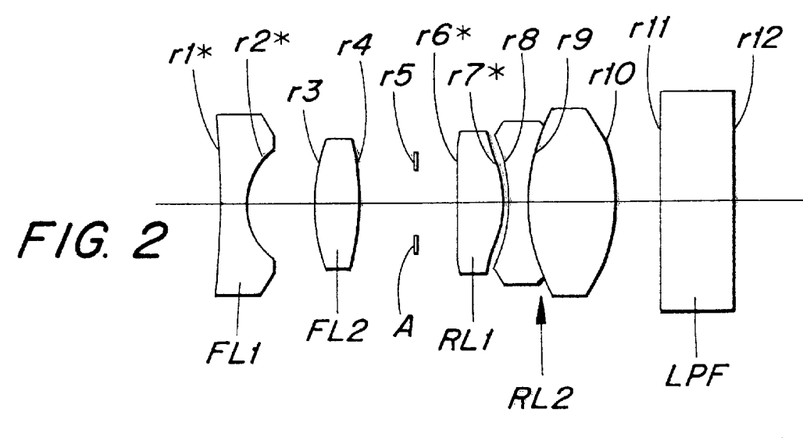
FIG. 2 is a lens arrangement diagram of the taking lens system of a second embodiment (Example 2) of the present invention.
Figure 3:
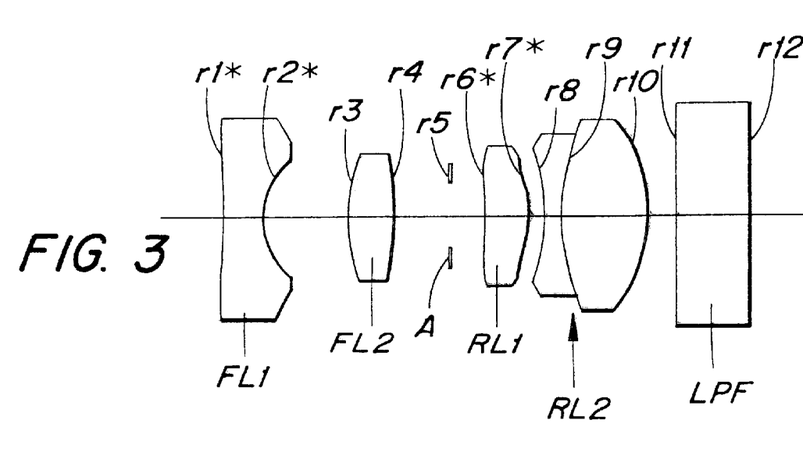
FIG. 3 is a lens arrangement diagram of the taking lens system of a third embodiment (Example 3) of the present invention.
Figure 4:
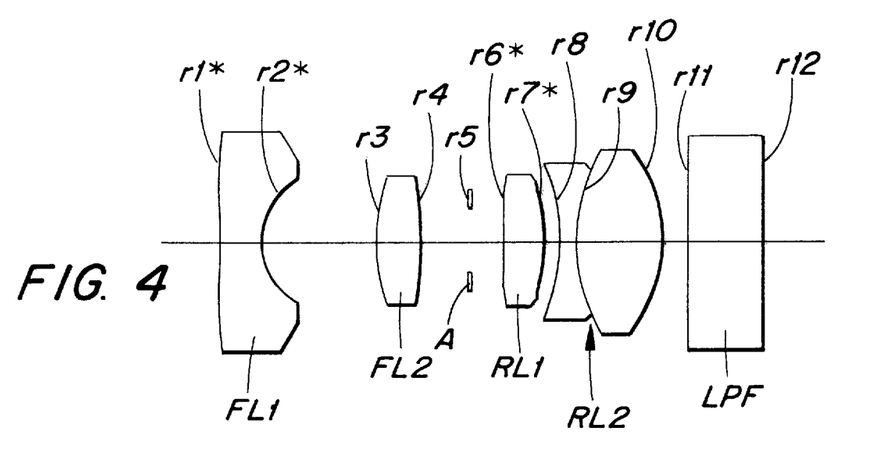
FIG. 4 is a lens arrangement diagram of the taking lens system of a fourth embodiment (Example 4) of the present invention.
Figure 5:
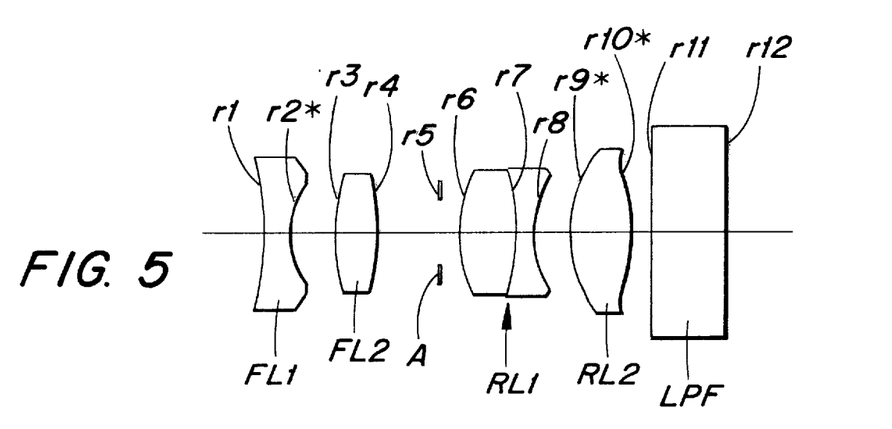
FIG. 5 is a lens arrangement diagram of the taking lens system of a fifth embodiment (Example 5) of the present invention.
Figure 6:
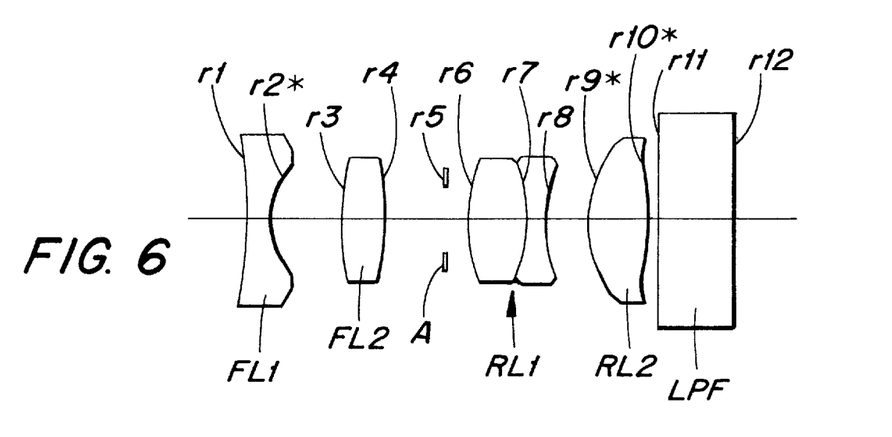
FIG. 6 is a lens arrangement diagram of the taking lens system of a sixth embodiment (Example 6) of the present invention.
Figure 7:
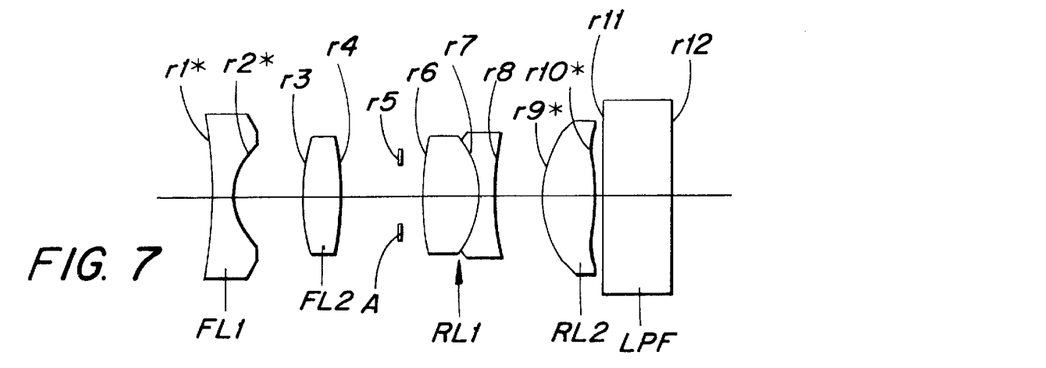
FIG. 7 is a lens arrangement diagram of the taking lens system of a seventh embodiment (Example 7) of the present invention.
Figure 8:
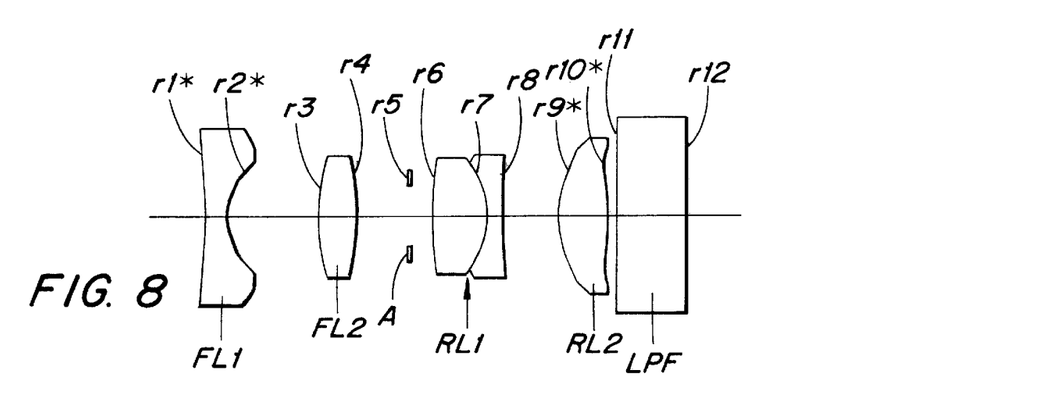
FIG. 8 is a lens arrangement diagram of the taking lens system of an eighth embodiment (Example 8) of the present invention.
Figure 9A:
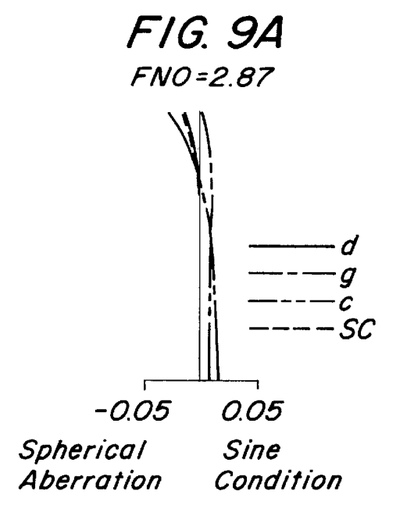
FIGS. 9A to 9C are graphic representations of the aberrations observed in the taking lens system of Example 1.
Figures 9B, 9C:
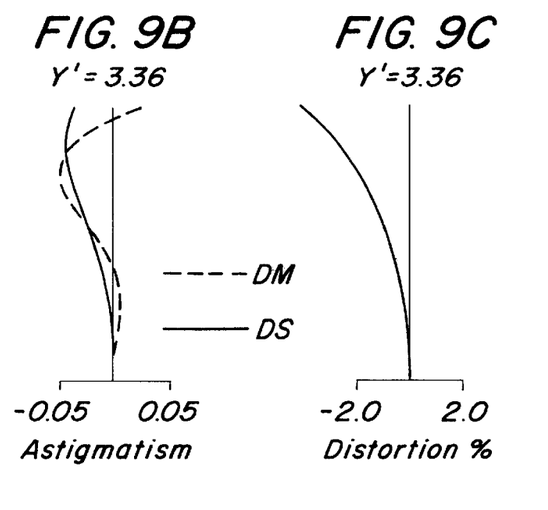
Figure 10A:
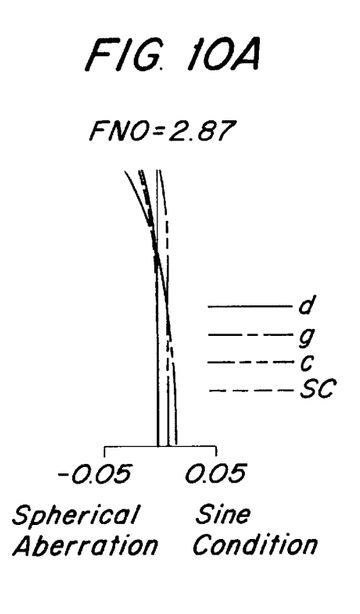
FIGS. 10A to 10C are graphic representations of the aberrations observed in the taking lens system of Example 2.
Figure 10B:
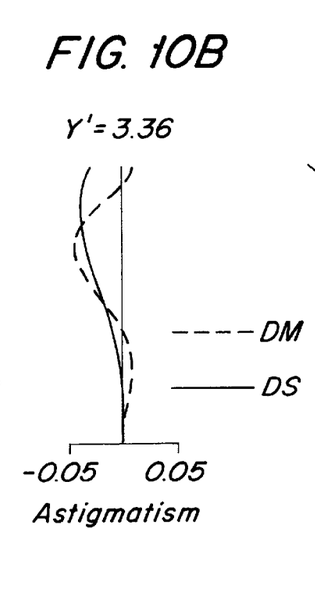
Figure 10C:
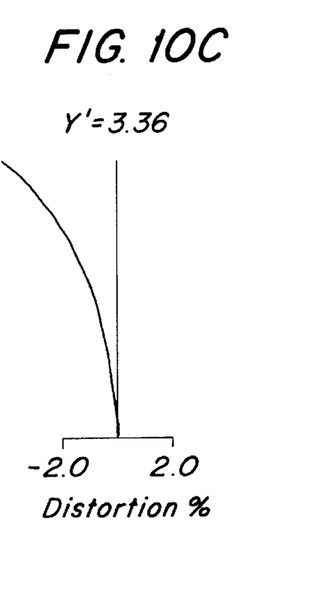
Figure 11A:
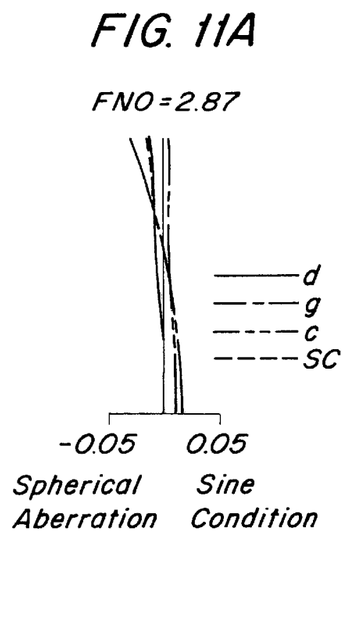
FIGS. 11A to 11C are graphic representations of the aberrations observed in the taking lens system of Example 3.
Figure 11B:
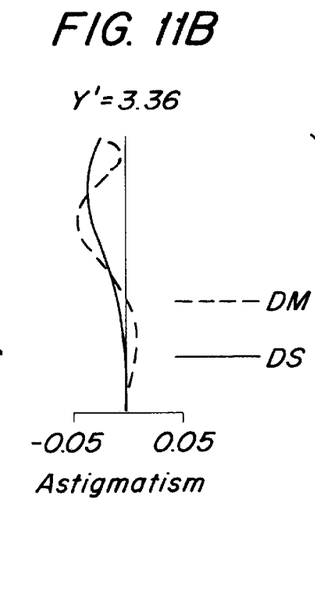
Figure 11C:
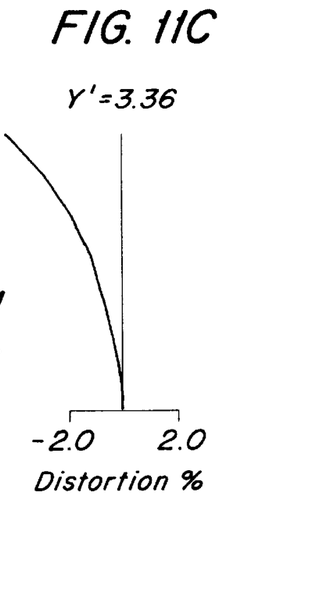
Figure 12A:
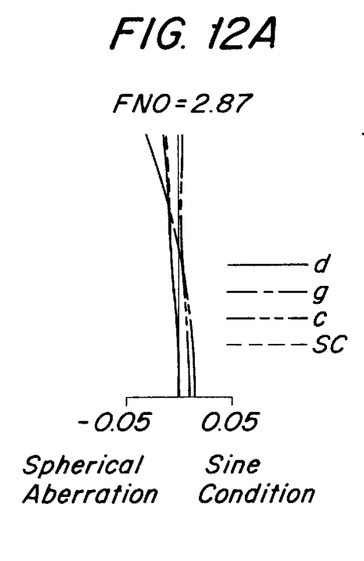
FIGS. 12A to 12C are graphic representations of the aberrations observed in the taking lens system of Example 4.
Figure 12B:
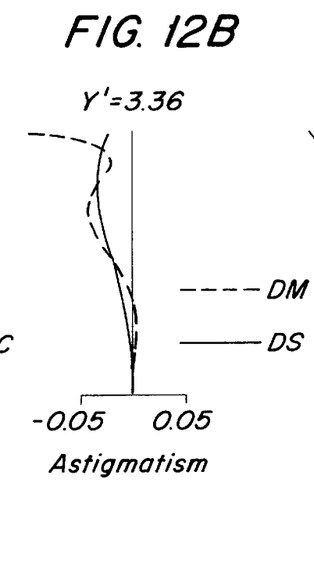
Figure 12C:
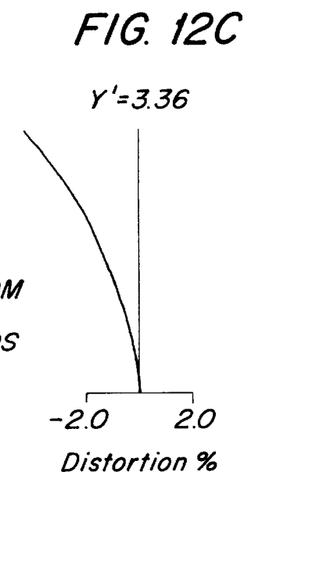
Figure 13A:
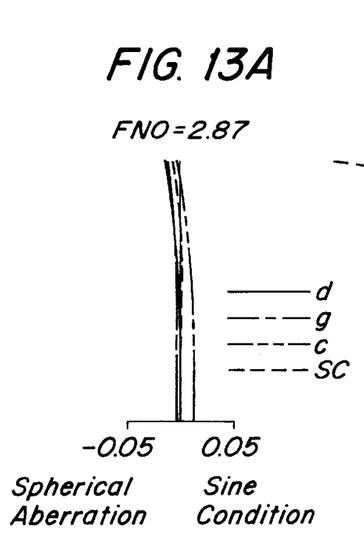
FIGS. 13A to 13C are graphic representations of the aberrations observed in the taking lens system of Example 5.
Figure 13B:
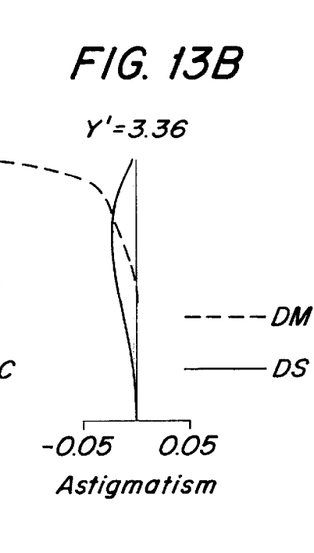
Figure 13C:
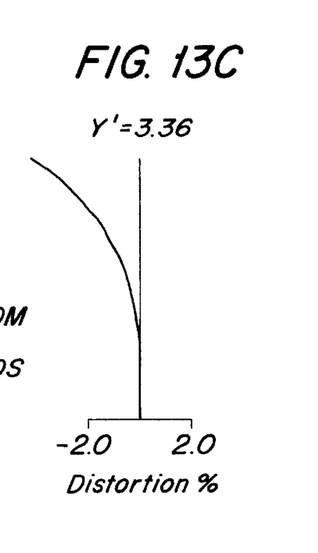
Figure 14A:
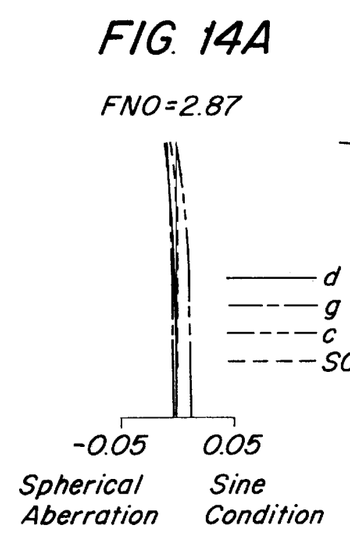
FIGS. 14A to 14C are graphic representations of the aberrations observed in the taking lens system of Example 6.
Figure 14B:
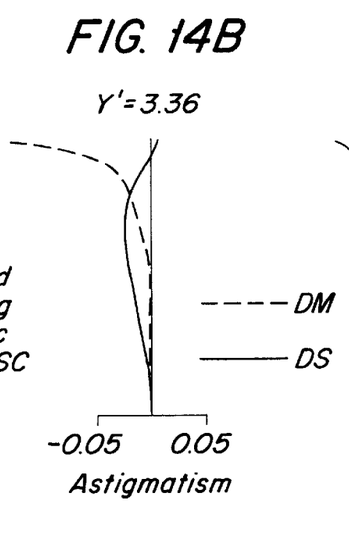
Figure 14C:
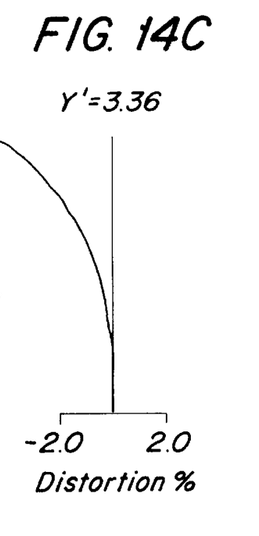
Figure 15A:
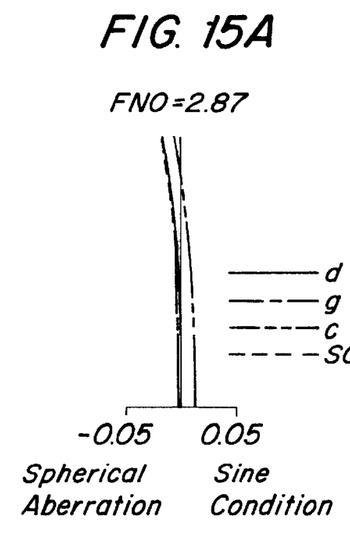
FIGS. 15A to 15C are graphic representations of the aberrations observed in the taking lens system of Example 7.
Figure 15B:
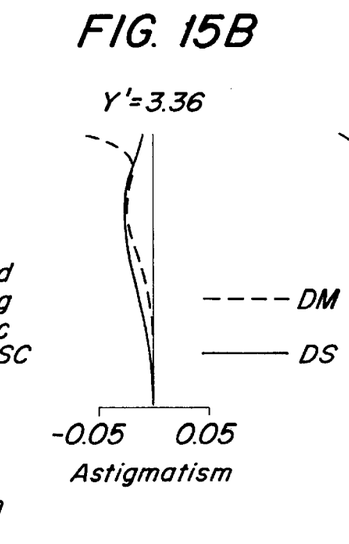
Figure 15C:
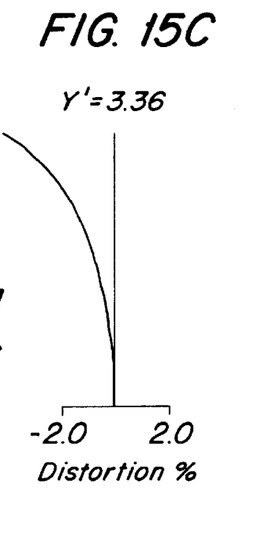
Figure 16A:
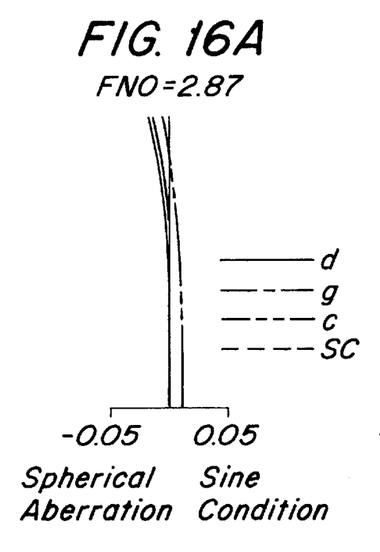
FIGS. 16A to 16C are graphic representations of the aberrations observed in the taking lens system of Example 8.
Figure 16B:
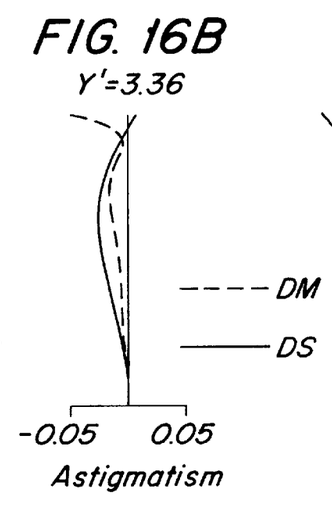
Figure 16C:
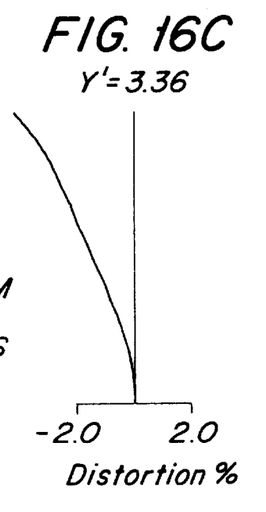
Figure 17:
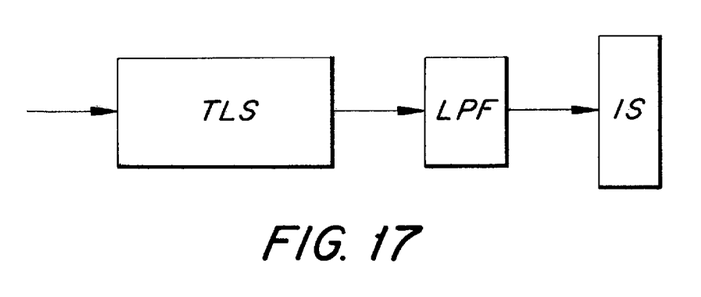
FIG. 17 is a block diagram illustrating the arrangement of optical components in a digital camera.

Hereinafter, fixed focal length taking lens systems embodying the present invention will be described with reference to the drawings. FIGS. 1 to 8 are lens arrangement diagrams of the lens systems of a first, a second, a third, a fourth, a fifth, a sixth, a seventh, and an eighth embodiment, respectively. In each diagram, the left-hand side corresponds to the object side, and the right-hand side corresponds to the image side. Aspherical surfaces are identified with an asterisk (*). In a digital camera, these components are arranged as shown in FIG. 17, where light from an object passes through the taking lens system (TLS) and the low pass filter (LPF) to be directed onto an image sensor (IS), such as a CCD.

As shown in FIGS. 1 to 4, in the first to fourth embodiments, the taking lens system is composed of, from the object side, a front lens unit consisting of a negative biconcave lens element FL1 (a first lens element) and a positive biconvex lens element FL2 (a second lens element), an aperture stop A, and a rear lens unit consisting of a positive meniscus lens element RL1 convex to the image side (a third lens element), and a doublet lens element RL2 formed by cementing together a biconcave lens element (a fourth lens element) and a biconvex lens element (a fifth lens element). A low-pass filter LPF is arranged on the image side of the rear lens unit.

As shown in FIGS. 5 to 8, in the fifth to eighth embodiments, the taking lens system is composed of, from the object side, a front lens unit consisting of a negative biconcave lens element FL1 (a first lens element) and a positive biconvex lens element FL2 (a second lens element), an aperture stop A, and a rear lens unit consisting of a doublet lens element RL1 formed by cementing together a biconvex lens element (a third lens element) and a biconcave lens element (a fourth lens element), and a positive biconvex lens element RL2 (a fifth lens element). A low-pass filter LPF is on the image side of the taking lens unit.

In all of the embodiments, the fixed focal length taking lens system adopts a "total movement" focusing method in which focusing from a condition focused on an infinite distance to a condition focused on a close distance is achieved by moving all of its constituent components toward the object side (not shown). Alternatively, it is also possible to achieve focusing in any other manner, for example, by moving the whole of the taking lens system while varying the distance between the aperture stop and the lens element disposed on the object side of the aperture stop and the distance between the aperture stop and the lens element disposed on the image side of the aperture stop, or by moving the individual lens elements separately, or by moving a plurality of lens elements simultaneously.

Next, the conditions to be preferably fulfilled by the taking lens systems of the embodiments will be described. The individual lens elements constituting the taking lens system are represented as, from the object side, a first, a second, a third, a fourth, and a fifth lens element, respectively. Note that, in any of the taking lens systems of the embodiments, it is not necessary that all of the conditions given below be fulfilled simultaneously; if any of those conditions are fulfilled, it is possible to achieve the corresponding advantages. It is needless to say, however, that more than one condition should preferably be fulfilled to obtain satisfactory results in terms of optical performance, miniaturization, and simplicity of assembly.

In all of the embodiments, it is preferable that the taking lens system fulfill Condition (1) below.

$$-0.99 < (r21+r22)/(r21-r22) < 0.56 \quad (1)$$

where r21 represents the radius of curvature of the object-side surface of the second lens element; and r22 represents the radius of curvature of the image-side surface of the second lens element.

Condition (1) defines the condition to be fulfilled, in particular, to achieve well-balanced correction of coma aberration. If the value of Condition (1) is equal to or less than its lower limit, coma aberration becomes so large as to have unduly adverse effects on high-order lateral chromatic aberration. In contrast, if the value of Condition (1) is equal to or greater than its upper limit, coma aberration becomes so large as to have unduly adverse effects on astigmatism.

In all of the embodiments, it is preferable that the taking lens system fulfill Condition (2) below.

$$0.12 < n2-n1 < 0.39 \quad (2)$$

where n1 represents the refractive index of the first lens element for the d line; and n2 represents the refractive index of the second lens element for the d line.

Condition (2) defines the condition to be fulfilled to achieve well-balanced correction of Petzval sum. If the value of Condition (2) is equal to or less than its lower limit, the Petzval sum becomes excessively great in the positive direction. In contrast, if the value of Condition (2) is equal to or greater than its upper limit, the Petzval sum becomes excessively great in the negative direction.

In the embodiments of FIGS. 5–8, it is preferable that the taking lens system fulfill Condition (3) below.

$$-0.02 < F/F34 < 0.18 \quad (3)$$

where

F represents the focal length of the entire taking lens system; and

F34 represents the focal length of the doublet lens element formed by cementing together the third and fourth lens elements.

Condition (3) defines the condition to be fulfilled, in particular, to achieve well-balanced correction of coma aberration. If the value of Condition (3) is equal to or less than its lower limit, coma aberration becomes so large as to have unduly adverse effects on high-order lateral chromatic aberration. In contrast, if the value of Condition (3) is equal to or greater than its upper limit, coma aberration becomes so large as to have unduly adverse effects on astigmatism.

In all of the embodiments, it is preferable that the taking lens system fulfill Condition (4) below.

$$0.3 < F/F345 < 0.9 \quad (4)$$

where

F represents the focal length of the entire taking lens system; and

F345 represents the composite focal length of the third to fifth lens elements.

Condition (4) defines the condition to be fulfilled, in particular, to strike a proper balance between the total length and the aberration characteristics. If the value of Condition (4) is equal to or less than its lower limit, aberrations can be corrected properly, but simultaneously the total length of the taking lens system needs to be made unduly long. An unduly long total length demands an unduly large diameter in the front lens unit, and thus makes the taking lens system as a whole unduly large. In contrast, if the value of Condition (4) is equal to or greater than its upper limit, the total length of the taking lens system is successfully minimized, but simultaneously aberrations (in particular, distortion and curvature of field) become unduly large.

In all of the embodiments, it is preferable that the taking lens system fulfill Condition (5) below.

$$0.01 < (X-X0)/N'-N) < 2.0 \quad (5)$$

where

X represents the deviation of the aspherical surface along the optical axis at the height in a direction perpendicular to the optical axis (the direction pointing to the object side is negative);

X0 represents the deviation of the reference spherical surface of the aspherical surface along the optical axis at the height in a direction perpendicular to the optical axis (the direction pointing to the object side is negative);

N represents the refractive index of the object-side medium of the aspherical surface for the d line; and N' represents the refractive index of the image-side medium of the aspherical surface for the d line.

Condition (5) defines the condition to be fulfilled, in particular, to correct distortion and curvature of field. If the value of Condition (5) is equal to or less than its lower limit, positive distortion increases, and simultaneously the inclination of the image plane toward the over side becomes unduly large. In contrast, if the value of Condition (5) is equal to or greater than its upper limit, negative distortion increases, and simultaneously the inclination of the image plane toward the under side becomes unduly large. This makes it impossible to realize a satisfactorily practical taking lens system. Note that, in a taking lens system that includes a plurality of aspherical surfaces, at least one of those aspherical surfaces needs to fulfill Condition (5) above; the other aspherical surfaces do not necessarily have to fulfill Condition (5) above, if that is advantageous for the correction of other aberrations.

In all of the embodiments, it is preferable that the taking lens system fulfill Condition (6) below.

$$0.47 < F/F2 < 1.47 \quad (6)$$

where

F represents the focal length of the entire taking lens system; and

F2 represents the focal length of the second lens element.

Condition (6) defines the condition to be fulfilled, in particular, to achieve well-balanced correction of coma aberration. If the value of Condition (6) is equal to or less than its lower limit, coma aberration becomes so large as to have unduly adverse effects on high-order lateral chromatic aberration. In contrast, if the value of Condition (6) is equal to or greater than its upper limit, coma aberration becomes so large as to have unduly adverse effects on astigmatism.

In all of the embodiments, it is preferable that the taking lens system fulfill Condition (7) below.

$$1 < img \times R < 15 \quad (7)$$

where img represents the maximum image height; and

R represents the effective diameter of the image-side-end surface.

Condition (7) defines the condition to be fulfilled to keep appropriate the size and the aberration characteristics of an optical system as well as the conditions expected to be fulfilled thereby when designed for use in a video camera. Usually, a solid-state imaging device (a CCD) has microlenses disposed on the front surfaces of the individual light-sensing elements provided therein so as to enhance its light-sensing efficiency. To make efficient use of the light-condensing ability of those microlenses, it is essential to let rays enter the microlenses substantially parallel to their optical axes. To achieve this, it is preferable to make the entire taking lens system telecentric toward the image side.

If the value of Condition (7) is equal to or greater than its upper limit, the entire taking lens system is too telecentric, and thus negative distortion becomes unduly large, and simultaneously the inclination of the image plane toward the under side becomes unduly large. In contrast, if the value of Condition (7) is equal to or less than its lower limit, it is difficult to make the entire taking lens system substantially telecentric. Even if the entire taking lens system can be made substantially telecentric, the back focal distance is then unduly long and thus the taking lens system as a whole is unduly large.

Hereinafter, taking lens systems embodying the present invention will be presented with reference to their construction data, graphic representations of aberrations, and other data. Tables 1 to 8 list the construction data of Examples 1 to 8, which respectively correspond to the first to eighth embodiments described above and have lens arrangements as shown in FIGS. 1 to 8.

In the construction data of each example, ri (i =1, 2, 3, . . . ) represents the ith surface counted from the object side and its radius of curvature, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith lens element counted from the object side. Moreover, f represents the focal length of the entire taking lens system, and FNO represents the F-number of the entire taking lens system. Furthermore, a surface whose radius of curvature ri is marked with an asterisk (( ) is a refractive optical surface having an aspherical shape, or a surface exerting a refracting effect equivalent to an aspherical surface, whose surface shape is defined by the following formula.

$$X(H) = (C \cdot H^2)/\{1 + \epsilon \cdot C^{2 \cdot H^2})\} + \Sigma A_i H^i$$

where

X(H) represents the displacement along the optical axis at the height H (relative to the vertex);

H represents the height in a direction perpendicular to the optical axis;

C represents the paraxial curvature;

$\epsilon$ represents the quadric surface parameter; and $A_i$ represents the aspherical coefficient of the ith order.

FIGS. 9A to 9C, 10A to 10C, 11A to 11C, 12A to 12C, 13A to 13C, 14A to 14C, 15A to 15C, and 16A to 16C are graphic representations of the aberrations observed in Examples 1 to 8, respectively. Of these diagrams, FIGS. 9A to 16A show spherical aberration and sine condition; FIGS. 9B to 16B show astigmatism; and FIGS. 9C to 16C show distortion. In the spherical aberration diagrams, the solid line (d) represents the spherical aberration for the d line; the dash-and-dot line g represents the spherical aberration for the g line; and the dash-dot-dot line c represents the spherical aberration for the c line. Moreover, the broken line (SC) represents the amount by which the sine condition remains unfulfilled. In the astigmatism diagrams, the solid line (DS) and the broken line (DM) represent the astigmatism on the sagittal plane and on the meridional plane, respectively. For spherical aberration, the F number is taken along the vertical axis. For astigmatism and distortion, the maximum image height Y' is taken along the vertical axis. Moreover, Table 9 lists the values corresponding to the parameters defined by Conditions (1) to (4), (6), and (7) in Examples 1 to 8, and Tables 10 to 17 list the values corresponding to Condition (5) to be fulfilled by the aspherical surface in Examples I to 8, respectively. Note that, in Tables 10 to 17, Y represents the maximum height of the optical path on the aspherical surface.

TABLE 1

Construction Data of Example 1
f = 5.5 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = −14.466 | d1 = 1.000 | N1 = 1.52510 | v1 = 56.38 |
| r2* = 2.869 | d2 = 2.022 | | |
| r3 = 8.079 | d3 = 1.951 | N2 = 1.77250 | v2 = 49.77 |
| r4 = −9.790 | d4 = 2.694 | | |
| r5 = (Aperture Stop) | d5 = 1.703 | | |
| r6* = 27.830 | d6 = 1.990 | N3 = 1.52510 | v3 = 56.38 |
| r7* = −4.334 | d7 = 0.167 | | |
| r8 = −7.673 | d8 = 0.750 | N4 = 1.75000 | v4 = 25.14 |
| r9 = 9.263 | d9 = 3.916 | N5 = 1.77250 | v5 = 49.77 |
| r10 = −7.281 | d10 = 1.720 | | |
| r11 = ∞ | d11 = 3.400 | N6 = 1.51680 | v6 = 64.20 |
| r12 = ∞ | | | |

[Aspherical Coefficients of First Surface (r1)]

$\epsilon = 0.10000 \times 10$
$A4 = 0.32598 \times 10^{-2}$
$A6 = -0.53772 \times 10^{-3}$
$A8 = 0.40558 \times 10^{-4}$
$A10 = -0.11829 \times 10^{-5}$

[Aspherical Coefficients of Second Surface (r2)]

$\epsilon = 0.10000 \times 10$
$A4 = 0.23068 \times 10^{-3}$
$A6 = -0.87711 \times 10^{-3}$
$A8 = -0.32225 \times 10^{-4}$

[Aspherical Coefficients of Sixth Surface (r6)]

$\epsilon = 0.10000 \times 10$
$A4 = 0.18957 \times 10^{-3}$
$A6 = 0.7572510 \times 10^{-4}$
$A8 = 0.15634 \times 10^{-4}$

[Aspherical Coefficients of Seventh Surface (r7)]

$\epsilon = 0.10000 \times 10$
$A4 = 0.33291 \times 10^{-2}$
$A6 = 0.91104 \times 10^{-4}$
$A8 = 0.19074 \times 1010^{-4}$

TABLE 2

Construction Data of Example 2
f = 5.08 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = #18.815 | d1= 1.174 | N1 = 1.52510 | v1 = 56.38 |
| r2* = 2.944 | d2 = 2.962 | | |
| r3 = 8.046 | d3 = 1.902 | N2 = 1.77250 | v2 = 49.77 |
| r4 = −12.815 | d4 = 2.535 | | |
| r5 = (Aperture Stop) | d5 = 1.795 | | |
| r6* = 186.397 | d6 = 1.978 | N3 = 1.52510 | v3 = 56.38 |
| r7* = 4.671 | d7 = 0.201 | | |
| r8 = −7.286 | d8 = 0.750 | N4 = 1.75000 | v4 = 25.14 |
| r9 = 8.268 | d9 = 3.802 | N5 = 1.77250 | v5 = 49.77 |
| r10 = −7.072 | d10 = 2.002 | | |
| r11 = ∞ | d11 = 3.400 | N6 = 1.51680 | v6 = 64.20 |
| r12 = ∞ | | | |

[Aspherical Coefficients of First Surface (r1)]

$\epsilon = 0.10000 \times 10$
$A4 = 0.38568 \times 10^{-2}$
$A6 = -0.47407 \times 10^{-3}$
$A8 = 0.29044 \times 10^{-4}$
$A10 = -0.70508 \times 10^{-6}$

[Aspherical Coefficients of Second Surface (r2)]

$\epsilon = 0.10000 \times 10$
$A4 = 0.18848 \times 10^{-2}$
$A6 = -0.69884 \times 10^{-3}$
$A8 = -0.37034 \times 10^{-4}$

TABLE 2-continued

Construction Data of Example 2
f = 5.08 mm (Focal Length of Entire Taking Lens System)
FNO = 2.87 (F-number)
[Aspherical Coefficients of Sixth Surface (r6)]

$\epsilon = 0.10000 \times 10$
$A4 = -0.55229 \times 10^{-4}$
$A6 = 0.41120 \times 10^{-4}$
$A8 = 0.11917 \times 10^{-4}$

[Aspherical Coefficients of Seventh Surface (r7)]

$\epsilon = 0.10000 \times 10$
$A4 = 0.33291 \times 10^{-2}$
$A6 = 0.83984 \times 10^{-4}$
$A8 = 0.15080 \times 10^{-4}$

TABLE 3

Construction Data of Example 3
f = 4.75 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = −20.753 | d1 = 1.684 | N1 = 1.52510 | ν1 = 56.38 |
| r2* = 3.061 | d2 = 3.764 | | |
| r3 = 8.337 | d3 = 2.028 | N2 = 1.77250 | ν2 = 49.77 |
| r4 = −14.877 | d4 = 2.368 | | |
| r5 = (Aperture Stop) | d5 = 1.524 | | |
| r6* = −51.018 | d6 = 1.858 | N3 = 1.52510 | ν3 = 56.38 |
| r7* = −5.136 | d7 = 0.672 | | |
| r8 = −8.525 | d8 = 0.750 | N4 = 1.79850 | ν4 = 22.60 |
| r9 = 9.772 | d9 = 3.775 | N5 = 1.77250 | ν5 = 49.77 |
| r10 = −6.594 | d10 = 1.336 | | |
| r11 = ∞ | d11 = 3.400 | N6 = 1.51680 | ν6 = 64.20 |
| r12 = ∞ | | | |

[Aspherical Coefficients of First Surface (r1)]

$\epsilon = 0.10000 \times 10$
$A4 = 0.34597 \times 10^{-2}$
$A6 = -0.29030 \times 10^{-3}$
$A8 = 0.13266 \times 10^{-4}$
$A10 = -0.24941 \times 10^{-6}$

[Aspherical Coefficients of Second Surface (r2)]

$\epsilon = 0.10000 \times 10$
$A4 = 0.26461 \times 10^{-2}$
$A6 = -0.39182 \times 10^{-2}$
$A8 = -0.38071 \times 10^{-4}$

[Aspherical Coefficients of Sixth Surface (r6)]

$\epsilon = 0.10000 \times 10$
$A4 = 0.55997 \times 10^{-3}$
$A6 = 0.41246 \times 10^{-4}$
$A8 = 0.22329 \times 10^{-4}$

[Aspherical Coefficients of Seventh Surface (r7)]

$\epsilon = 0.10000 \times 10$
$A4 = 0.38136 \times 10^{-2}$
$A6 = 0.14206 \times 10^{-3}$
$A8 = 0.17258 \times 10^{-4}$

TABLE 4

Construction Data of Example 4
f = 4.45 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = −25.047 | d1 = 1.835 | N1 = 1.52510 | ν = 56.38 |
| r2* = 3.236 | d2 = 5.109 | | |
| r3 = 8.334 | d3 = 1.991 | N2 = 1.77250 | ν2 = 49.77 |
| r4 = −18.189 | d4 = 2.129 | | |
| r5 = (Aperture Stop) | d5 = 1.506 | | |
| r6* = −74.710 | d6 = 1.774 | N3 = 1.52510 | ν3 = 56.38 |
| r7* = #6.086 | d7 = 0.727 | | |
| r8 = −8.960 | d8 = 0.750 | N4 = 1.79850 | ν4 = 22.60 |
| r9 = 8.054 | d9 = 3.876 | N5 = 1.77250 | ν5 = 49.77 |
| r10 = −6.465 | d10 = 1.198 | | |
| r11 = ∞ | d11 = 3.400 | N6 = 1.51680 | ν6 = 64.20 |
| r12 = ∞ | | | |

[Aspherical Coefficients of First Surface (r1)]

$\epsilon = 0.10000 \times 10$
$A4 = 0.29609 \times 10^{-2}$
$A6 = -0.18008 \times 10^{-3}$
$A8 = 0.59843 \times 10^{-5}$
$A10 = -0.81068 \times 10^{-7}$

[Aspherical Coefficients of Second Surface (r2)]

$\epsilon = 0.10000 \times 10$
$A4 = 0.24791 \times 10^{-2}$
$A6 = -0.72633 \times 10^{-3}$
$A8 = -0.38558 \times 10^{-5}$

[Aspherical Coefficients of Sixth Surface (r6)]

$\epsilon = 0.10000 \times 10$
$A4 = 0.79719 \times 10^{-3}$
$A6 = 0.25473 \times 10^{-4}$
$A8 = 0.19582 \times 10^{-4}$

[Aspherical Coefficients of Seventh Surface (r7)]

$\epsilon = 0.10000 \times 10$
$A4 = 0.41192 \times 10^{-2}$
$A6 = 0.14598 \times 10^{-3}$
$A8 = 0.15095 \times 10^{-4}$

TABLE 5

Construction Data of Example 5
f = 5.55 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1 = −14.041 | d1 = 1.000 | N1 = 1.52510 | ν1 = 56.38 |
| r2* = 3.248 | d2 = 2.191 | | |
| r3 = 11.415 | d3 = 1.798 | N2 = 1.85000 | ν2 = 40.04 |
| r4 = −13.010 | d4 = 2.703 | | |
| r5 = (Aperture Stop) | d5 = 1.000 | | |
| r6 = 6.844 | d6 = 2.529 | N3 = 1.77250 | ν3 = 49.77 |
| r7 = −8.719 | d7 = 0.750 | N4 = 1.75000 | ν4 = 25.14 |
| r8 = 5.135 | d8 = 1.715 | | |
| r9* = 6.722 | d9 = 2.597 | N5 = 1.52510 | ν5 = 56.38 |
| r10* = −6.717 | d10 = 0.919 | | |
| r11 = ∞ | d11 = 3.400 | N6 = 1.51680 | ν6 = 64.20 |
| r12 = ∞ | | | |

[Aspherical Coefficients of Second Surface (r2)]

$\epsilon = 0.10000 \times 10$
$A4 = -0.38963 \times 10^{-2}$
$A6 = -0.98085 \times 10^{-4}$
$A8 = -0.26318 \times 10^{-4}$

[Aspherical Coefficients of Ninth Surface (r9)]

$\epsilon = 0.10000 \times 10$
$A4 = -0.22552 \times 10^{-3}$
$A6 = 0.72085 \times 10^{-4}$
$A8 = 0.68284 \times 10^{-6}$

[Aspherical Coefficients of Tenth Surface (r10)]

$\epsilon = 0.10000 \times 10$
$A4 = 0.21821 \times 10^{-2}$

TABLE 5-continued

Construction Data of Example 5
f = 5.55 mm (Focal Length of Entire Taking Lens System)
FNO = 2.87 (F-number)

A6 = 0.10796 × 10⁻⁴
A8 = 0.72248 × 10⁻⁵

TABLE 6

Construction Data of Example 6
f = 5.08 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1 = −19.703 | d1 = 1.000 | N1 = 1.52510 | ν1 = 56.38 |
| r2* = 3.283 | d2 = 3.321 | | |
| r3 = 13.385 | d3 = 1.770 | N2 = 1.85000 | ν2 = 40.04 |
| r4 = −12.871 | d4 = 2.615 | | |
| r5 = (Aperture Stop) | d5 = 1.000 | | |
| r6 = 7.317 | d6 = 2.546 | N3 = 1.77250 | ν3 = 49.77 |
| r7 = −6.841 | d7 = 0.750 | N4 = 1.75000 | ν4 = 25.14 |
| r8 = 5.573 | d8 = 2.042 | | |
| r9* = 6.103 | d9 = 2.502 | N5 = 1.52510 | ν5 = 56.38 |
| r10* = −8.403 | d10 = 0.554 | | |
| r11 = ∞ | d11 = 3.400 | N6 = 1.51680 | ν6 = 64.20 |
| r12 = ∞ | | | |

[Aspherical Coefficients of Second Surface (r2)]

ε = 0.10000 × 10
A4 = −0.32151 × 10⁻²
A6 = −0.61776 × 10⁻⁴
A8 = −0.26559 × 10⁻⁴

[Aspherical Coefficients of Ninth Surface (r9)]

ε = 0.10000 × 10
A4 = −0.30193 × 10⁻³
A6 = 0.70895 × 10⁻⁴
A8 = 0.13241 × 10⁻⁵

[Aspherical Coefficients of Tenth Surface (r10)]

ε = 0.10000 × 10
A4 = 0.25310 × 10⁻²
A6 = 0.18889 × 10⁻⁴
A8 = 0.79656 × 10⁻⁵

TABLE 7

Construction Data of Example 7
f = 4.75 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = #16.409 | d1 = 1.000 | N1 = 1.52510 | ν1 = 56.38 |
| r2* = 3.090 | d2 = 3.427 | | |
| r3 = 11.537 | d3 = 1.826 | N2 = 1.85000 | ν2 = 40.04 |
| r4 = −13.947 | d4 = 2.799 | | |
| r5 = (Aperture Stop) | d5 = 1.200 | | |
| r6 = 14.134 | d6 = 2.638 | N3 = 1.77250 | ν3 = 49.77 |
| r7 = A.734 | d7 = 0.750 | N4 = 1.75000 | ν4 = 25.14 |
| r8 = 14.443 | d8 = 2.331 | | |
| r9* = 6.298 | d9 = 2.374 | N5 = 1.52510 | ν5 = 56.38 |
| r10* = −12.035 | d10 = 0.500 | | |
| r11 = ∞ | d11 = 3.400 | N6 = 1.51680 | ν6 = 64.20 |
| r12 = ∞ | | | |

[Aspherical Coefficients of First Surface (r1)]

ε = 0.10000 × 10
A4 = 0.18968 × 10⁻²
A6 = −0.17409 × 10⁻³
A8 = 0.58303 × 10⁻⁵

TABLE 7-continued

Construction Data of Example 7
f = 4.75 mm (Focal Length of Entire Taking Lens System)
FNO = 2.87 (F-number)

[Aspherical Coefficients of Second Surface (r2)]

ε = 0.10000 × 10
A4 = −0.14087 × 10⁻²
A6 = −0.26121 × 10⁻³
A8 = −0.46363 × 10⁻⁴

[Aspherical Coefficients of Ninth Surface (r9)]

ε = 0.1000 × 10
A4 = 0.41700 × 10⁻⁴
A6 = 0.65832 × 10⁻⁴
A8 = 0.10742 × 10⁻⁵

[Aspherical Coefficients of Tenth Surface (r10)]

ε = 0.10000 × 10
A4 = 0.25448 × 10⁻²
A6 = 0.68837 × 10⁻⁴
A8 = 0.44660 × 10⁻⁵

TABLE 8

Construction Data of Example 8
f = 4.45 mm (Focal Length of Entire Taking Lens System)
FNO = 2.87 (F-number)

| Radius of Curvature | Axial Distance | Refractive Index (Nd) | Abbe Number(d) |
|---|---|---|---|
| r1* = −14.669 | d1 = 1.000 | N1 = 1.52510 | ν1 = 56.38 |
| r2* = 3.184 | d2 = 4.546 | | |
| r3 = 11.731 | d3 = 1.859 | N2 = 1.85000 | ν2 = 40.04 |
| r4 = −13.911 | d4 = 2.535 | | |
| r5 = (Aperture Stop) | d5 = 1.200 | | |
| r6 = 18.535 | d6 = 2.599 | N3 = 1.77250 | ν3 = 49.77 |
| r7 = −4.578 | d7 = 0.750 | N4 = 1.84666 | ν4 = 23.82 |
| r8 = 38.938 | d8 = 2.807 | | |
| r9* = 6.681 | d9 = 2.305 | N5 = 1.52510 | ν5 = 56.38 |
| r10* = −12.665 | d10 = 0.500 | | |
| r11 = ∞ | d11 = 3.400 | N6 = 1.51680 | ν6 = 64.20 |
| r12 = ∞ | | | |

[Aspherical Coefficients of First Surface (r1)]

ε = 0.10000 × 10
A4 = 0.26468 × 10⁻²
A6 = −0.17738 × 10⁻³
A8 = 0.46293 × 10⁻⁵

[Aspherical Coefficients of Second Surface (r2)]

ε = 0.10000 × 10
A4 = −0.10075 × 10⁻³
A6 = −0.58352 × 10⁻⁴
A8 = −0.54769 × 10⁻⁴

TABLE 8-continued

Construction Data of Example 8

[Aspherical Coefficients of Ninth Surface (r9)]

$\epsilon = 0.10000 \times 10$
$A4 = -0.53743 \times 10^{-3}$
$A6 = 0.11163 \times 10^{-3}$
$A8 = 0.43934 \times 10^{-6}$

[Aspherical Coefficients of Tenth Surface (r10)]

$\epsilon = 0.10000 \times 10$
$A4 = 0.15771 \times 10^{-2}$
$A6 = 0.11216 \times 10^{-3}$
$A8 = 0.52257 \times 10^{-5}$

TABLE 9

Values Corresponding to Parameters defined by Conditions (1) to (4), (6), and (7)

| | (r21 + r22)/(r21 − r22) | n2 − n1 | F/F34 | F/F345 | F/F2 | img × r |
|---|---|---|---|---|---|---|
| Example 1 | −0.10 | 0.25 | | 0.63 | 0.92 | 11.09 |
| Example 2 | −0.23 | 0.25 | | 0.58 | 0.76 | 11.09 |
| Example 3 | −0.28 | 0.25 | | 0.53 | 0.66 | 11.26 |
| Example 4 | −0.37 | 0.25 | | 0.48 | 0.58 | 11.26 |
| Example 5 | −0.07 | 0.32 | −0.002 | 0.64 | 0.75 | 10.95 |
| Example 6 | 0.02 | 0.32 | 0.002 | 0.57 | 0.64 | 10.89 |
| Example 7 | −0.09 | 0.32 | 0.060 | 0.55 | 0.62 | 11.05 |
| Example 8 | −0.09 | 0.32 | 0.028 | 0.49 | 0.57 | 11.05 |

TABLE 10

Values Corresponding to Condition (5) in Example 1

| Height | (X-X0)/(N'-N) |
|---|---|
| [1st Surface(r1)] | |
| 0.00 Y | 0.00000 |
| 0.20 Y | 0.00056 |
| 0.40 Y | 0.00763 |
| 0.60 Y | 0.02992 |
| 0.80 Y | 0.06692 |
| 1.00 Y | 0.11070 |
| [2nd Surface(r2)] | |
| 0.00 Y | 0.00000 |
| 0.20 Y | −0.00000 |
| 0.40 Y | 0.00044 |
| 0.60 Y | 0.00675 |
| 0.80 Y | 0.04281 |
| 1.00 Y | 0.17821 |
| [6th Surface(r6)] | |
| 0.00 Y | 0.00000 |
| 0.20 Y | 0.00001 |
| 0.40 Y | 0.00019 |
| 0.60 Y | 0.00131 |
| 0.80 Y | 0.00606 |
| 1.00 Y | 0.02263 |
| [7th Surface(r7)] | |
| 0.00 Y | 0.00000 |
| 0.20 Y | −0.00030 |
| 0.40 Y | −0.00492 |
| 0.60 Y | −0.02604 |
| 0.80 Y | −0.08911 |
| 1.00 Y | −0.24617 |

TABLE 11

Values Corresponding to Condition (5) in Example 2

| Height | (X-X0)/(N'-N) |
|---|---|
| [1st Surface(r1)] | |
| 0.00 Y | 0.00000 |
| 0.20 Y | 0.00109 |
| 0.40 Y | 0.01506 |
| 0.60 Y | 0.06019 |
| 0.80 Y | 0.13988 |
| 1.00 Y | 0.24627 |
| [2nd Surface(r2)] | |
| 0.00 Y | 0.00000 |
| 0.20 Y | −0.00014 |
| 0.40 Y | −0.00171 |
| 0.60 Y | −0.00294 |
| 0.80 Y | 0.01883 |
| 1.00 Y | 0.14656 |
| [6th Surface(r6)] | |
| 0.00 Y | 0.00000 |
| 0.20 Y | −0.00000 |
| 0.40 Y | −0.00002 |
| 0.60 Y | 0.00011 |
| 0.80 Y | 0.00160 |
| 1.00 Y | 0.00914 |
| [7th Surface(r7)] | |
| 0.00 Y | 0.00000 |
| 0.20 Y | −0.00030 |
| 0.40 Y | −0.00495 |
| 0.60 Y | −0.02606 |
| 0.80 Y | −0.08825 |
| 1.00 Y | −0.23977 |

TABLE 12

Values Corresponding to Condition (5) in Example 3

| Height | (X-X0)/(N'-N) |
|---|---|
| [1st Surface(r1)] | |
| 0.00 Y | 0.00000 |
| 0.20 Y | 0.00162 |
| 0.40 Y | 0.02289 |
| 0.60 Y | 0.09465 |
| 0.80 Y | 0.23112 |
| 1.00 Y | 0.42933 |
| [2nd Surface(r2)] | |
| 0.00 Y | 0.00000 |
| 0.20 Y | −0.00024 |
| 0.40 Y | −0.00343 |
| 0.60 Y | −0.01307 |
| 0.80 Y | −0.01853 |
| 1.00 Y | 0.04236 |
| [6th Surface(r6)] | |
| 0.00 Y | 0.00000 |
| 0.20 Y | 0.00002 |
| 0.40 Y | 0.00039 |
| 0.60 Y | 0.00219 |
| 0.80 Y | 0.00828 |
| 1.00 Y | 0.02628 |
| [7th Surface(r7)] | |
| 0.00 Y | 0.00000 |
| 0.20 Y | −0.00029 |
| 0.40 Y | −0.00475 |
| 0.60 Y | −0.02517 |
| 0.80 Y | −0.08566 |
| 1.00 Y | −0.23297 |

TABLE 13

Values Corresponding to Condition (5) in Example 4

| Height | (X-X0)/(N'-N) |
|---|---|
| [1st Surface(r1)] | |
| 0.00 Y | 0.00000 |
| 0.20 Y | 0.00257 |
| 0.40 Y | 0.03627 |
| 0.60 Y | 0.15045 |
| 0.80 Y | 0.36893 |
| 1.00 Y | 0.68939 |
| [2nd Surface(r2)] | |
| 0.00 Y | 0.00000 |
| 0.20 Y | −0.00036 |
| 0.40 Y | −0.00548 |
| 0.60 Y | −0.02432 |
| 0.80 Y | −0.05232 |
| 1.00 Y | −0.01202 |
| [6th Surface(r6)] | |
| 0.00 Y | 0.00000 |
| 0.20 Y | 0.00003 |
| 0.40 Y | 0.00052 |
| 0.60 Y | 0.00278 |
| 0.80 Y | 0.00976 |
| 1.00 Y | 0.02840 |
| [7th Surface(r7)] | |
| 0.00 Y | 0.00000 |
| 0.20 Y | −0.00029 |
| 0.40 Y | −0.00476 |
| 0.60 Y | −0.02507 |
| 0.80 Y | −0.08450 |
| 1.00 Y | −0.22633 |

TABLE 14

Values Corresponding to Condition (5) in Example 5

| Height | (X-X0)/(N'-N) |
|---|---|
| [2nd Surface(r2)] | |
| 0.00 Y | 0.00000 |
| 0.20 Y | 0.00023 |
| 0.40 Y | 0.00377 |
| 0.60 Y | 0.01977 |
| 0.80 Y | 0.06649 |
| 1.00 Y | 0.17928 |
| [9th Surface(r9)] | |
| 0.00 Y | 0.00000 |
| 0.20 Y | −0.00006 |
| 0.40 Y | −0.00055 |
| 0.60 Y | 0.00154 |
| 0.80 Y | 0.02489 |
| 1.00 Y | 0.12727 |
| [10th Surface(r10)] | |
| 0.00 Y | 0.00000 |
| 0.20 Y | −0.00075 |
| 0.40 Y | −0.01223 |
| 0.60 Y | −0.06493 |
| 0.80 Y | −0.22816 |
| 1.00 Y | −0.66954 |

TABLE 15

Values Corresponding to Condition (5) in Example 6

| Height | (X-X0)/(N'-N) |
|---|---|
| [2nd Surface(r2)] | |
| 0.00 Y | 0.00000 |
| 0.20 Y | 0.00030 |
| 0.40 Y | 0.00489 |
| 0.60 Y | 0.02592 |
| 0.80 Y | 0.08957 |
| 1.00 Y | 0.25359 |
| [9th Surface(r9)] | |
| 0.00 Y | 0.00000 |
| 0.20 Y | −0.00010 |
| 0.40 Y | −0.00101 |
| 0.60 Y | −0.00011 |
| 0.80 Y | 0.02373 |
| 1.00 Y | 0.14164 |
| [10th Surface(r10)] | |
| 0.00 Y | 0.00000 |
| 0.20 Y | −0.00056 |
| 0.40 Y | −0.00763 |
| 0.60 Y | −0.02992 |
| 0.80 Y | −0.06692 |
| 1.00 Y | −0.11070 |

TABLE 16

Values Corresponding to Condition (5) in Example 7

| Height | (X-X0)/(N'-N) |
|---|---|
| [1st Surface(r1)] | |
| 0.00 Y | 0.00000 |
| 0.20 Y | 0.00060 |
| 0.40 Y | 0.00851 |
| 0.60 Y | 0.03524 |
| 0.80 Y | 0.08372 |
| 1.00 Y | 0.14712 |
| [2nd Surface(r2)] | |
| 0.00 Y | 0.00000 |
| 0.20 Y | 0.00015 |
| 0.40 Y | 0.00283 |
| 0.60 Y | 0.01833 |
| 0.80 Y | 0.08130 |
| 1.00 Y | 0.29579 |
| [9th Surface(r9)] | |
| 0.00 Y | 0.00000 |
| 0.20 Y | 0.00003 |
| 0.40 Y | 0.00116 |
| 0.60 Y | 0.01181 |
| 0.80 Y | 0.06574 |
| 1.00 Y | 0.25899 |
| [10th Surface(r10)] | |
| 0.00 Y | 0.00000 |
| 0.20 Y | −0.00092 |
| 0.40 Y | −0.01529 |
| 0.60 Y | −0.08330 |
| 0.80 Y | −0.29574 |
| 1.00 Y | −0.85079 |

TABLE 17

Values Corresponding to Condition (5) in Example 8

| Height | (X-X0)/(N'-N) |
|---|---|
| [1st Surface(r1)] | |
| 0.00 Y | 0.00000 |
| 0.20 Y | 0.00125 |
| 0.40 Y | 0.01806 |
| 0.60 Y | 0.07667 |
| 0.80 Y | 0.18952 |
| 1.00 Y | 0.34943 |
| [2nd Surface(r2)] | |
| 0.00 Y | 0.00000 |
| 0.20 Y | 0.00002 |
| 0.40 Y | 0.00051 |
| 0.60 Y | 0.00640 |
| 0.80 Y | 0.04913 |
| 1.00 Y | 0.26096 |
| [9th Surface(r9)] | |
| 0.00 Y | 0.00000 |
| 0.20 Y | −0.00020 |
| 0.40 Y | −0.00220 |
| 0.60 Y | −0.00194 |
| 0.80 Y | 0.03541 |
| 1.00 Y | 0.22053 |
| [10th Surface(r10)] | |
| 0.00 Y | 0.00000 |
| 0.20 Y | 0.00058 |
| 0.40 Y | −0.01021 |
| 0.60 Y | −0.06054 |
| 0.80 Y | −0.23806 |
| 1.00 Y | −0.75937 |

What is claimed is:

1. A fixed focal length taking lens system comprising, in order from an object side:
   a front lens unit having first and second lens elements in that order from the object side, the second lens element being a biconvex lens element;
   an aperture stop; and
   a rear lens unit having a third positive lens element, a fourth negative lens element and a fifth positive lens element in that order from the object side with no intervening lenses therebetween,
   wherein the following condition is fulfilled:

$0.3 < F/F345 < 0.9$ where
   F represents the focal length of the entire taking lens system; and
   F345 represents the composite focal length of the third to fifth lens elements.

2. The taking lens system of claim 1 wherein the following condition is fulfilled:

$-0.99 < (r21+r22)/(r21-r22) < 0.56$ where
   r21 represents the radius of curvature of the object-side surface of the second lens element; and
   r22 represents the radius of curvature of the image-side surface of the second lens element.

3. The taking lens system of claim 1 wherein said first lens element is a biconcave lens element.

4. The taking lens system of claim 3 wherein said first lens element is a negative lens element and the second lens element is a positive lens element.

5. The taking lens system of claim 4 wherein the following condition is fulfilled:

$0.12 < n2-n1 < 0.39$ where
   n1 represents the refractive index of the first lens element for the d line; and
   n2 represents the refractive index of the second lens element for the d line.

6. The taking lens system of claim 1 wherein at least two of the lens elements of said rear lens unit are cemented together to form a lens doublet.

7. The taking lens system of claim 6 wherein the fourth and fifth lens elements are cemented together.

8. The taking lens system of claim 6 wherein the third and fourth lens elements are cemented together.

9. The taking lens system of claim 8 wherein the following condition is fulfilled:

$-0.02 < F/F34 < 0.18$ where
   F represents the focal length of the entire taking lens system; and
   F34 represents the focal length of the lens doublet formed by the third and fourth lens elements.

10. The taking lens system as claimed in claim 1, wherein at least one of the lens elements is provided, at least on one side thereof, with an aspherical surface and wherein the following condition is fulfilled:

$0.01 < |(X-X0)/(N'-N)| < 2.0$ where
    X represents a deviation of the aspherical surface along an optical axis at a height in a direction perpendicular to the optical axis, where a direction pointing to the object side is negative;
    X0 represents a deviation of a reference spherical surface of the aspherical surface along an optical axis at a height in a direction perpendicular to the optical axis;
    N represents the refractive index of an object-side medium of the aspherical surface for the d line; and
    N' represents the refractive index of an image-side medium of the aspherical surface for the d line.

11. The taking lens system as claimed in claim 1, wherein the following condition is fulfilled:

$0.47 < F/F2 < 1.47$ where
    F represents a focal length of the entire taking lens system; and
    F2 represents a focal length of the second lens element.

12. The taking lens system as claimed in claim 1, wherein the following condition is fulfilled:

$1 < img \times R < 15$ where
    img represents a maximum image height; and
    R represents an effective diameter of an image-side-end surface.

13. A digital camera comprising a taking lens system, a low-pass filter and an image sensor, wherein said taking lens system includes, in order from an object side:

a front lens unit having first and second lens elements in that order from the object side, the second lens element being a biconvex lens element;

an aperture stop; and a rear lens unit having a third positive lens element, a fourth negative lens element and a fifth positive lens element in that order from the object side with no intervening lenses therebetween, wherein the following condition is fulfilled:

$$0.3<F/F345<0.9$$

where

F represents the focal length of the entire taking lens system; and

F345 represents the composite focal length of the third to fifth lens elements.

14. The digital camera of claim 13 wherein the following condition is fulfilled:

$$-0.99<(r21+r22)/(r2-r22)<0.56$$

where r21 represents the radius of curvature of the object-side surface of the second lens element; and r22 represents the radius of curvature of the image-side surface of the second lens element.

15. The digital camera of claim 13 wherein said first lens element is a biconcave lens element.

16. The digital camera of claim 15 wherein said first lens element is a negative lens element and the second lens element is a positive lens element.

17. The digital camera of claim 16 wherein the following condition is fulfilled:

$$0.12<n2-n1<0.39$$

where n1 represents the refractive index of the first lens element for the d line; and n2 represents the refractive index of the second lens element for the d line.

18. The digital camera of claim 13 wherein at least two of the lens elements of said rear lens unit are cemented together to form a lens doublet.

19. The digital camera of claim 18 wherein the fourth and fifth lens elements are cemented together.

20. The digital camera of claim 18 wherein the third and fourth lens elements are cemented together.

21. The digital camera of claim 20 wherein the following condition is fulfilled:

$$-0.02<F/F34<0.18$$

where

F represents the focal length of the entire taking lens system; and

F34 represents the focal length of the lens doublet formed by the third and fourth lens elements.

22. The digital camera as claimed in claim 13, wherein at least one of the lens elements is provided, at least on one side thereof, with an aspherical surface and wherein the following condition is fulfilled:

$$0.01<|(X-X0)/(N'-N)|<2.0$$

where

X represents a deviation of the aspherical surface along an optical axis at a height in a direction perpendicular to the optical axis, where a direction pointing to the object side is negative;

X0 represents a deviation of a reference spherical surface of the aspherical surface along an optical axis at a height in a direction perpendicular to the optical axis;

N represents the refractive index of an object-side medium of the aspherical surface for the d line; and N' represents the refractive index of an image-side medium of the aspherical surface for the d line.

23. The digital camera as claimed in claim 13, wherein the following condition is fulfilled:

$$0.47<F/F2<1.47$$

where

F represents a focal length of the entire taking lens system; and

F2 represents a focal length of the second lens element.

24. The digital camera as claimed in claim 13, wherein the following condition is fulfilled:

$$1<img\times R<15$$

where img represents a maximum image height; and

R represents an effective diameter of an image-side-end surface.

25. A fixed focal length taking lens system comprising, in order from an object side:

a first negative lens element;

a second biconvex lens element;

an aperture stop;

a third positive lens element;

a fourth negative lens element; and and a fifth positive lens element, wherein there are no intervening lenses between the second biconvex lens element and the aperture stop, wherein the first negative lens element is separated from the second biconvex lens element with no intervening lenses therebetween, and wherein the following condition is fulfilled:

$$-0.99<(r21+r22)/(r21-r22)<0.56$$

where r21 represents a radius of curvature of an object-side surface of the second biconvex lens element; and r22 represents a radius of curvature of an image-side surface of the second biconvex lens element.

26. A fixed focal length taking lens system comprising, in order from an object side:

a first biconcave lens element;

a second positive lens element;

an aperture stop;

a third positive lens element;

a fourth negative lens element; and a fifth positive lens element, wherein there are no intervening lenses between the second positive lens element and the aperture stop, and wherein the following condition is fulfilled:

$$0.12<n2-n1<0.39$$

where
- n1 represents a refractive index of the first lens element for the d line; and
- n2 represents a refractive index of the second lens element for the d line.

27. A fixed focal length taking lens system comprising, in order from an object side:
- a first negative lens element;
- a second positive lens element;
- an aperture stop;
- a third positive lens element;
- a fourth negative lens element; and
- a fifth positive lens element,
- wherein the third and fourth lens elements are cemented together to form a doublet lens element and wherein the following condition is fulfilled:

$$-0.02 < F/F34 < 0.18$$

where
- F represents a focal length of the entire taking lens system; and
- F34 represents a focal length of the doublet lens element formed by cementing together the third and fourth lens elements.

28. A fixed focal length taking lens system comprising, in order from an object side:
- a first negative lens element;
- a second biconvex lens element;
- an aperture stop;
- a third positive lens element;
- a fourth negative lens element; and
- a fifth positive lens element, the third, fourth and fifth lens elements having no intervening lenses therebetween,
- wherein the third and fourth lens elements are cemented together and wherein the following condition is fulfilled:

$$0.3 < F/F345 < 0.9$$

where
- F represents a focal length of the entire taking lens system; and
- F345 represents a composite focal length of the third to fifth lens elements.

29. A fixed focal length taking lens system comprising, in order from an object side:
- a first negative lens element;
- a second biconvex lens element;
- an aperture stop;
- a third positive meniscus lens element convex to an image side;
- a fourth negative lens element; and
- a fifth positive lens element, the third, fourth and fifth lens elements having no intervening lenses therebetween,
- wherein the fourth and fifth lens elements are cemented together and wherein the following condition is fulfilled:

$$0.3 < F/F345 < 0.9$$

where
- F represents a focal length of the entire taking lens system; and
- F345 represents a composite focal length of the third to fifth lens elements.

* * * * *